US006766051B2

(12) United States Patent
Klassen et al.

(10) Patent No.: US 6,766,051 B2
(45) Date of Patent: Jul. 20, 2004

(54) ADAPTIVE TREE-BASE LOOKUP FOR NON-SEPARABLY DIVIDED COLOR TABLES

(75) Inventors: R. Victor Klassen, Webster, NY (US); Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 733 days.

(21) Appl. No.: 09/731,346

(22) Filed: Dec. 6, 2000

(65) Prior Publication Data

US 2002/0067849 A1 Jun. 6, 2002

(51) Int. Cl.[7] ................................ G06K 9/00
(52) U.S. Cl. ....................... 382/162; 382/276
(58) Field of Search ............................. 382/162, 167, 382/276; 358/518, 523; 711/216

(56) References Cited

U.S. PATENT DOCUMENTS 4,992,861 A * 2/1991 D'Errico ..................... 358/518
5,802,219 A * 9/1998 Farkas et al. ............... 382/276

* cited by examiner

Primary Examiner—Phuoc Tran
(74) Attorney, Agent, or Firm—Fay, Sharpe, Fagan, Minnich & McKee, LLP

(57) ABSTRACT

A method of color transformation is based on non-separable tiling of a color space. Non-separable tiling allows fine granularity where it is desired and coarse granularity where it is tolerable. Non-separable tiling of the color space provides improved transformation quality for a given lookup table size. Color space is recursively tiled and addressed. Transformation information from the tiles is stored in a database. Database searching techniques are used to speed information access. For example, a hashing function and hashing table are employed to store and retrieve transformation information. An image processor operative to perform the method includes a database index generator and a database of transformation information. For example, the database index generator generates a hashing key from pixel information and uses a hashing function to generate a database cell index. The image processor includes an output device. The output device is, for example, a xerographic printer.

36 Claims, 9 Drawing Sheets

ADAPTIVE TREE-BASE LOOKUP FOR NON-SEPARABLY DIVIDED COLOR TABLES

BACKGROUND OF THE INVENTION

1. Field of the Invention

The invention relates to the art of color image processing. For example, it finds application where an image created on, or prepared for rendering on, a first or source device is prepared for rendering on a second or destination device.

2. Description of Related Art

When an image is prepared for rendering on an electronic device the image is represented as a set of pixels. Each pixel describes a small portion of the image in terms of colorant pixel values for the colorants available on the rendering device. For example, typically a cathode ray tube (CRT) based computer display screen is comprised of red (R), green (G) and blue (B) phosphors. An image prepared for display on a CRT is described with a set of pixels. Each pixel describes the intensity with which the red, green and blue phosphors are to be illuminated on a small portion of the CRT. A similar procedure is followed when an image is prepared for rendering on a printing device. Currently, at least some color printing devices apply cyan (C), magenta (M), yellow (Y), and sometimes black (K) colorants to a print medium, such as paper or velum, in order to render an image. Such printing devices are said to operate in a CMY or CMYK color space. When an image is prepared for rendering on a color-printing device, the image is represented as a set of pixels. Each pixel describes a small portion of the image by calling for an appropriate mixture of the available colorants. Typically, the pixel value for each colorant can range from 0 to 255. The higher a colorant's pixel value is, the more of that colorant the color image processor applies to the print medium. In a system employing 8-bit precision for the colorant signals, the number 255 represents the maximum or fully saturated amount of colorant. The number 0 is used when none of a particular colorant is required.

In a CRT operating in RGB (red, green blue) space, fully saturated red is described by a pixel calling for R=255, G=0, B=0. In a printer operating in CMYK (cyan, magenta, yellow, black) space, fully saturated red is described by a pixel calling for C=0, M=255, Y=255, K=0 Magenta and yellow colorants combine through simple subtractive mixing and are perceived as red. There is no guarantee that the red described in RGB space and displayed on the CRT is the same red described in CMYK space and printed on a page. In fact, it is quite likely that the spectral properties of the red phosphor used in the CRT will be different than the spectral properties of the subtractively mixed magenta and yellow colorants of a particular printer.

As mentioned above, the CRT and the CMYK printer use different materials to generate the perception of color. The materials used impact the set of colors that each device can reproduce.

The set of colors a device can produce is referred to as the color gamut of the device. There is no guarantee that a color that can be produced by a first device is within the color gamut of a second device. This is even true when both devices are CMYK printers.

Where color matching is required between two devices such as the CRT operating in RGB space and the printer operating in CMYK space, transforms based on calibration and measurement are required. In such a situation it is possible, for example, that the pure red RGB CRT pixel mentioned above, is mapped to a CMYK printer pixel calling for a less than fully saturated magenta component and a small amount of a cyan component. For example, the CMYK version of the original RGB red pixel referred to above might call for C=27, M=247, Y=255, K=0. Furthermore, if one wants to print a copy of the original pure red RGB CRT pixel on a second printer it is quite likely that a second transform will have to be used. That transform may translate the original RGB CRT pixel to a second CMYK pixel. For example, the second transform may map the original RGB CRT pixel to a second CMYK pixel calling for C=20, M=234, Y=240, K=35. One reason two different CMYK printers may require different transforms is that different printers use different colorants. For example, a first magenta colorant used in a first printer may have a different spectral content than a second magenta colorant used in a second printer. Likewise, a first yellow colorant used in a first printer may have a different spectral content than a second yellow colorant used in a second printer.

From the foregoing discussion it can be seen that an image prepared for rendering on a first device may need to be transformed if it is to be properly rendered on a second device. Such a transformation is an attempt to emulate the first or source device onto the second or destination device. In order to achieve calorimetric matching, the emulation of the color gamut of the CRT on the first CMYK printer caused the red CRT pixel to be mapped to a first CMYK pixel calling for C=27, M=247, Y=255, K=0. The emulation of the color gamut of the CRT on the second CMYK printer caused the red CRT pixel to be mapped to the second CMYK pixel calling for C=20, M=234, Y=240, K=35. Obviously, therefore, even where there is no RGB CRT image involved, an image prepared for printing on the first printer may have to be transformed before its calorimetric content can be matched on the second printer. In such a situation the first printer is said to be emulated on the second printer.

For example, when, a photographic image has been prepared for rendering on a first CMYK device, for example a Standard Web Offset Printing (SWOP) device, but must then be rendered on a second CMYK device, for example, a xerographic printer, a "4 to 4" transform is typically used to emulate the first device on the second device.

An image processor must be able to satisfactorily transform images, prepared for rendering on a staggeringly large number of source devices, for rendering on an equally large number of rendering devices. For example, a personal computer, configured to operate as an image processor, through the use of, for example, a web browser, word processor, or desktop publishing software, must be able to accept images created or downloaded from almost anywhere, and render the images pleasingly on any image output terminal the user connects to the personal computer. For example, the image processor must be able to pleasingly display images on a computer screen and send commands to have images rendered pleasingly on any printer the user connects to the personal computer. Similarly, document processors and copiers must transform images pleasingly and accurately. Indeed, in document processors and copiers, color accuracy requirements can be very stringent. For example, in a large print job, comprising a corporate sales presentation, it is very important that colors in a company logo be reproduced accurately and consistently. Similarly, colors in a clothing catalog must match the colors on depicted garments.

Typically transformations are carried using look up tables. For example, an image prepared for rendering in a RGB color space of a computer monitor, is transformed into a CMYK color space of a printer, using a three-dimensional look up table. Each of the RGB parameters is used as an axis or index into the look up table. The RGB parameters are typically represented by 8-bit values for each of the R, G, and B components. Such a 24-bit RGB vector is capable of addressing over 16.77 million locations or describing over 16.77 million colors. However, look up tables of this size are physically impractical in most cases. Therefore, such look up tables are typically partitioned into a smaller size, such as, for example, 16×16×16 (4096) table locations or nodes. Each node stores, for example, a CMYK value. CMYK values of points not directly represented by nodes, are determined by a form of interpolation among nodes of the look up table (LUT).

An illustration of the operation of a prior art look up table is instructive. Referring to FIG. 1, an input RGB value is used to determine index values r, g, b into the table 112. The index values are used to locate the transformation data within the table. For example, the index values corresponding to a point 116 do not coincide with any node location 120. Therefore, a transformation value is not directly available from the table 112. Instead, the conversion is accomplished by interpolating between the CMYK values stored in nodes 124 corresponding to the point 116. For example, the nodes 124 correspond to the point 116 because they are the nodes 124 nearest the input point 116. The input RGB color is defined in three dimensions. Therefore, the interpolation is done in three dimensions. Common examples of 3-D interpolation techniques include trilinear, tetrahedral, and prism interpolation. Of these, tetrahedral interpolation is the fastest method, requiring interpolation only among 4 nodes. (The trilinear and prism schemes utilize 8 and 6 nodes, respectively.) All these techniques require several multiplication, addition, shift, and comparison operations for each output signal or parameter at each pixel; and are often implemented with special purpose hardware. This interpolated CMYK value is then output. Typically, the output is eventually rendered, for example, on a printer.

A look-up table suitable for color transformations is a tiling of a portion of color space corresponding at least to the color gamut of the intended (real or virtual) input device. (A tiling of space is a division of space into abutting regions with no voids)

As depicted in FIG. 1, tiling in prior art look up tables is even and regular. That is to say, each tile is a cube, and the dimensions of each cube are the same. For example, each cube or tile is four parameter value increments wide, four parameter value increments high, and four parameter value increments deep. Such a look up table includes 26,144 tiles or cubes arranged in a grid of 64×64×64 cubes or tiles. In other words, every fourth parameter value is represented by a node. For example, a red axis has a nodes at R=0, 3, 7, 11 . . . 251, 255. Likewise a green axis has nodes at G=0, 3, 7, 11 . . . 251, 255. and a blue axis has nodes at B=0, 3, 7, 11 . . . 251, 255. Those skilled in the art will recognize that determining which cube, tile, or nodes to use, in a prior art look up table, to determine a transformation value for a set of RGB parameter values is a trivial matter. For example, where the pixel parameter values are represented by eight bit words, an appropriate tile, is found by shifting the bits in the eight bit words. For example, R>>2, G>>2, B>>2 shifts bits representing an RGB parameter value, two positions to the right, leaving the six highest order bits in each parameter for use as an index or address of the appropriate node. The two low order bits of the three values indicate the position corresponding to the input color description within the cube or tile. The low order bits are used in interpolating between the nodes of the cube or tile.

This indexing and tile accessing method is very fast. However, the speed comes at a price. In order to use this prior art indexing method, one is forced to quantize or tile a color space into equal, regularly sized and regularly shaped tiles. Furthermore, one is forced to use a fine quantization (small tile size) that ensures the required transformation accuracy is achieved throughout the look up table, even though some parts of the look up table may require only coarse quantization. This means that these prior art look up tables consume more memory than would otherwise be required.

BRIEF SUMMARY OF THE INVENTION

In order to reduce memory consumption while maintaining or even improving image transformation accuracy, a method and apparatus operative for transforming a description of a color from a first color space, defined by first color space parameters, into a second color space, defined by second color space parameters, has been developed. The method comprises the steps of storing transformation data in a search tree based database, receiving a set of first color space parameter values for transformation, generating a database index from the set of first color space parameter values, using the generated database index to access transformation data in the database, and transforming the first set of color space parameter values to a set of second color space parameter values based on the accessed transformation data.

In an exemplary embodiment the method comprises the steps of storing transformation data in a hashing table, receiving a set of first color space parameter values for transformation, generating a hashing key from the set of first color space parameter values, using the hashing key in a hashing function to generate a cell index, using the cell index to access transformation data in the hashing table and transforming the first set of color space parameter values to a set of second color space parameter values based on the accessed transformation data.

An image processor operative to transform a first image description, based in a first color space, described by a set of first color space parameters, into a second image description, based in a second color space, described by a set of second color space parameters comprises a database index generator and a search tree based database. The database index generator is operative to generate database indices based on sets of first color space parameter values. The search tree database is operative to store transformation information for a plurality of regions of color space, in association with the database indices.

In an exemplary embodiment of the image processor the database key generator further comprises a pixel processor operative to manipulate first color space parameter values to generate a key, and the cell index generator is operative to use the key to generate a cell index.

In one embodiment of the image processor the database comprises a hashing table.

One advantage of the present invention resides in a reduction in memory required to store color transformation look up tables at a specified level of accuracy.

Another advantage of the present invention is found in design flexibility afforded by the freedom to use rule based transformation processes, rather than being restricted to transformation by interpolation between look up table nodes.

Yet another advantage of the present invention is apparent in improved image transformations provided by a reduction in an amount of required design compromise. Since fine look up table tiling or quantization can be used where needed and any extra memory used by the fine tiling can be compensated for by using coarse tiling where coarse can be tolerated, fewer trade offs have to be made with regard to look up table quantization and required memory.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Figure 2:
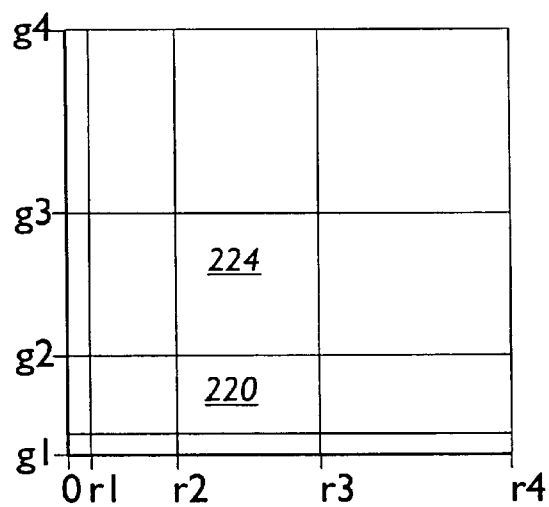
FIG. 2 is a depiction of a portion of a look up table having an improved separable tiling.

One step toward overcoming the disadvantage of wasted memory space in the prior art look up table, while maintaining a comparable access speed, is to use variable, yet still separable, tiling. For example, referring to FIG. 2, one face of a multi-dimensional look up table indexed with, for example RGB values, is partitioned unevenly, but separably. For example, the look up table is partitioned according to: {[0, r1], [r1+1, r2], ..., [rk, 255]}, {[0, g1], [g1+1, r2], ..., [gm, 255]}, {[0, b1], [b1+1, b2], ..., [bn, 255]} where the color space parameters r1 ... rk, g1 ... gm, and b1 ... bn are not restricted to be evenly spaced or related to one another. Only one face of such a look up table is illustrated FIG. 2. Therefore, the tiles are represented as two-dimensional rectangles. In actuality, the tiling consists of 3 dimensional rectangles or boxes: {[0,r1]×[0,g1]×[0,b1], [{0, r1]×[0,g1]×[b1+1,b2], ... , [{rk,255]×[gm,255]×[bn,255]}. Of course, if a first or input color space comprises four or more parameters, as in, for example, a CMYK color space or a HI-FI color space, the tiles of the look up table are thought of as hyper-rectangles. In the RGB example, each tile consists of separable Cartesian products of three intervals, one interval from each portioned axis. Tiles of this sort, illustrated in FIG. 2, are accessible in any of a number of ways. The method selected is usually dependent on architecture of a computing platform used. One method is to use a device similar to tone reproduction curves. In this method, color space parameter values are rescaled to compensate for the unequal node spacing along each look up table axis. Then a method similar to the bit shifting discussed in reference to the prior art look up table is applied.

The look up table described in reference to FIG. 2 uses memory somewhat more efficiently than does the prior art method. The memory savings is achieved with only a small increase in access time. Indeed, if the step of bit shifting is included in the values stored in the resealing tone reproduction type curves; the cost in access time can be almost negligible. For example, where separability is maintained 3D tiles are products of three 1D tile sets (intervals). Thus, searching for the tile containing a given point (x, y, z) can be performed as three 1D search problems: search the first 1D tile set for the interval containing x (call it A), search the second 1D tile set for the interval containing y (call it B), and search the third 1D tile set for the interval containing z (call it C). The required 3D tile is the Cartesian product of A, B, and C: A×B×C, and is therefore identified simply by combining the results of three very fast searches.

Nevertheless, the method of FIG. 2 is still more restrictive than is desirable. For example, all tiles bounded by index or axis positions r2 and r3 are necessarily the same width. Additionally, all the tiles bounded by index or axis positions g2 and g3 are necessarily the same height. Therefore, for example, where a first tile 220 bound by r2 and r3 is preferably wide and a second tile 224 bound by r2 and r3 is preferably narrow, some less than ideal, compromise width, must be selected and used for both tiles. Therefore, memory is not conserved to the desired degree and/or desired transformation accuracy is not achieved to the desired degree.

Figure 3:
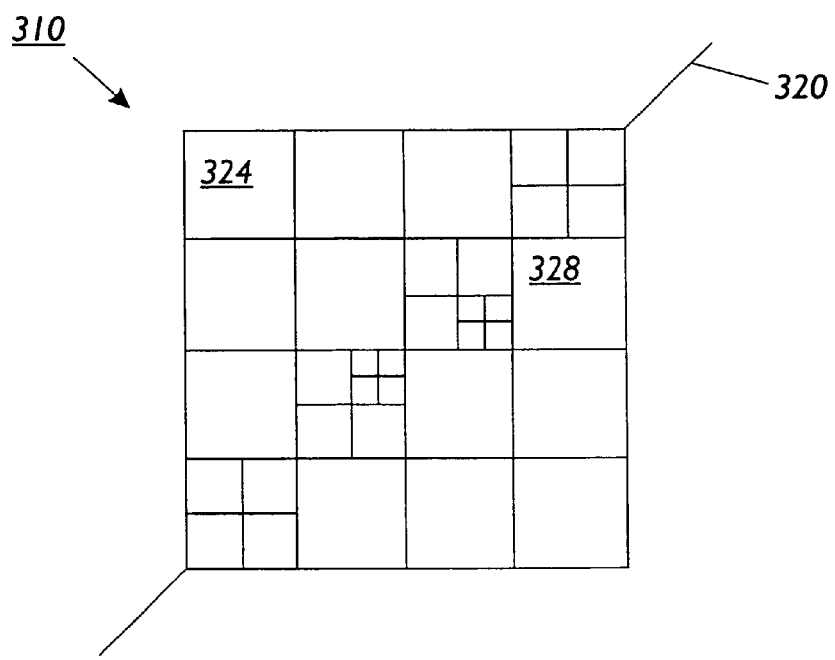
FIG. 3 is a depiction of a portion of a look up table that is not restricted to separable tiling.

Referring to FIG. 3 a more general and preferable tiling 310 includes, for example, squares (or cubes and hyper-cubes) that are not necessarily separable Cartesian products of parameter ranges. By foregoing separability, the look up table designer is given the freedom to use fine tiling where it is required, and course tiling where course tiling does not cause errors or where errors can be tolerated. For example, in a case involving printer correction look up tables, it is often desirable to more finely sample color space in regions near a neutral axis 320, while more course sampling suffices for less critical 324 or out-of-gamut 328 regions. Therefore, at least in the case of printer correction look up tables, being free to use non-separable tiling reduces look up table storage requirements, and/or improves look up table precision and accuracy. However, non-separable tiling has been difficult to use. For example, it is not possible to use the fast 1D searches described in reference to FIG. 2 where tiling is non-separable.

Therefore, until now, non-separable tiling has required a much slower more complicated accessing method. Elaborate chains of range tests and/or switch statements have been used to determine which tile to use to transform a particular set of pixel values. These techniques are prohibitively time consuming.

Figure 4A:
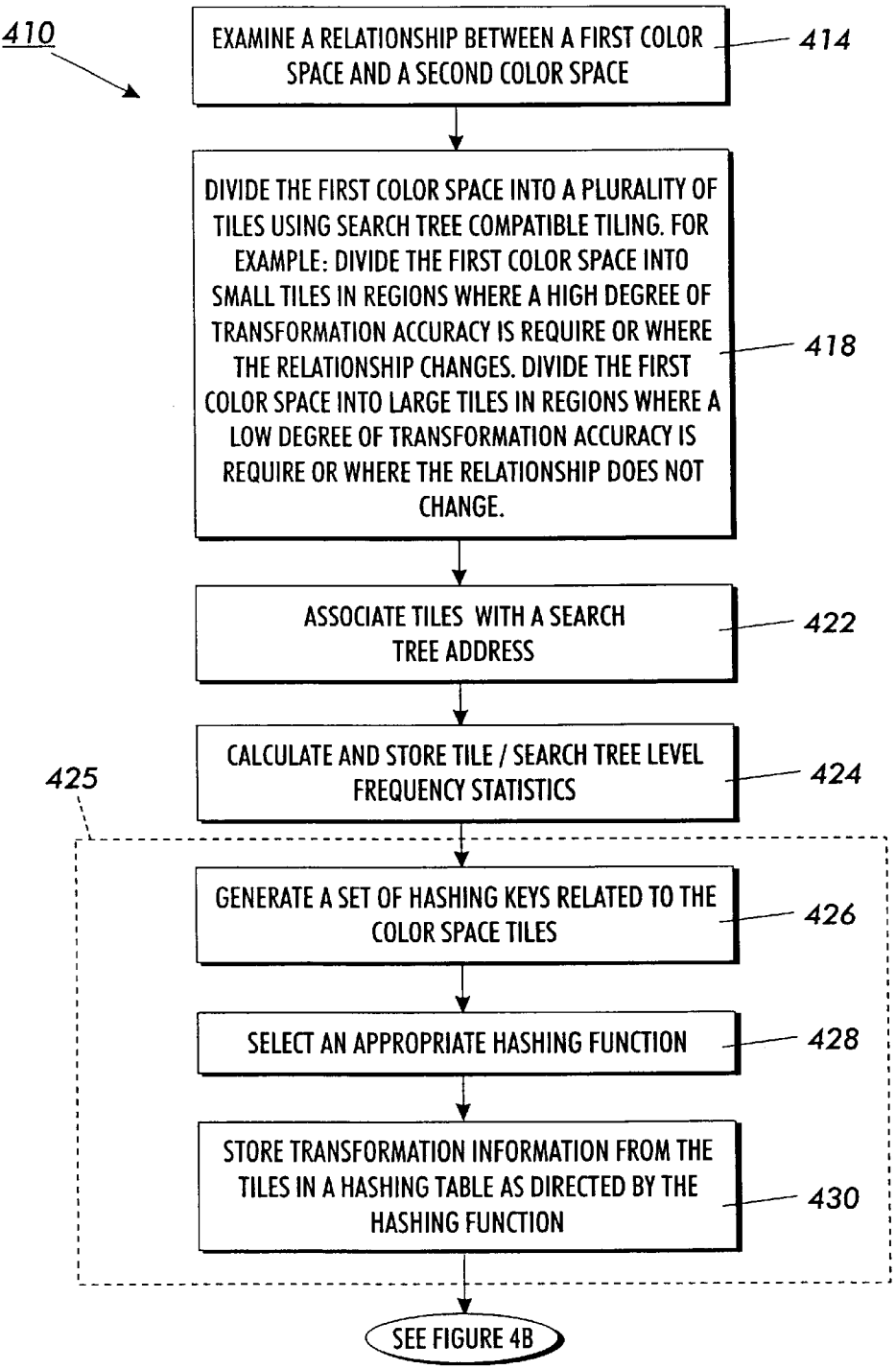
FIG. 4A–FIG. 4B is a flow chart outlining a method using database techniques to store and access transformation information.

Now however, a fast method of using non-separably tiled look up tables has been developed. Referring to FIG. 4A, a high-speed method 410 for using non-separable tiling in color transformation look up tables allows for the use of non-separable color space tiling in order to conserve transformation table memory. The method 410 substitutes database storage and retrieval techniques in place of the use of the traditional parameter value indices.

The method 410 includes a color space relationship examination step 414. In the color space relationship examination step 414 a look up table designer, or a look up table generation software module, examines a relationship between a first color space and a second color space. For example, a transformation relationship between the first color space and the second color space is analyzed. Regions where the relationship is approximately linear, and points where the relationship exhibits higher curvature, are identified. Linear regions need few nodes if linear interpolation is used to obtain values between the nodes. Additionally points in the second color space that are unimportant are also identified. For example, regions in the first color space that correspond to regions in the second color space that are outside of, for example, a rendering device's color gamut, are identified.

Figure 1:
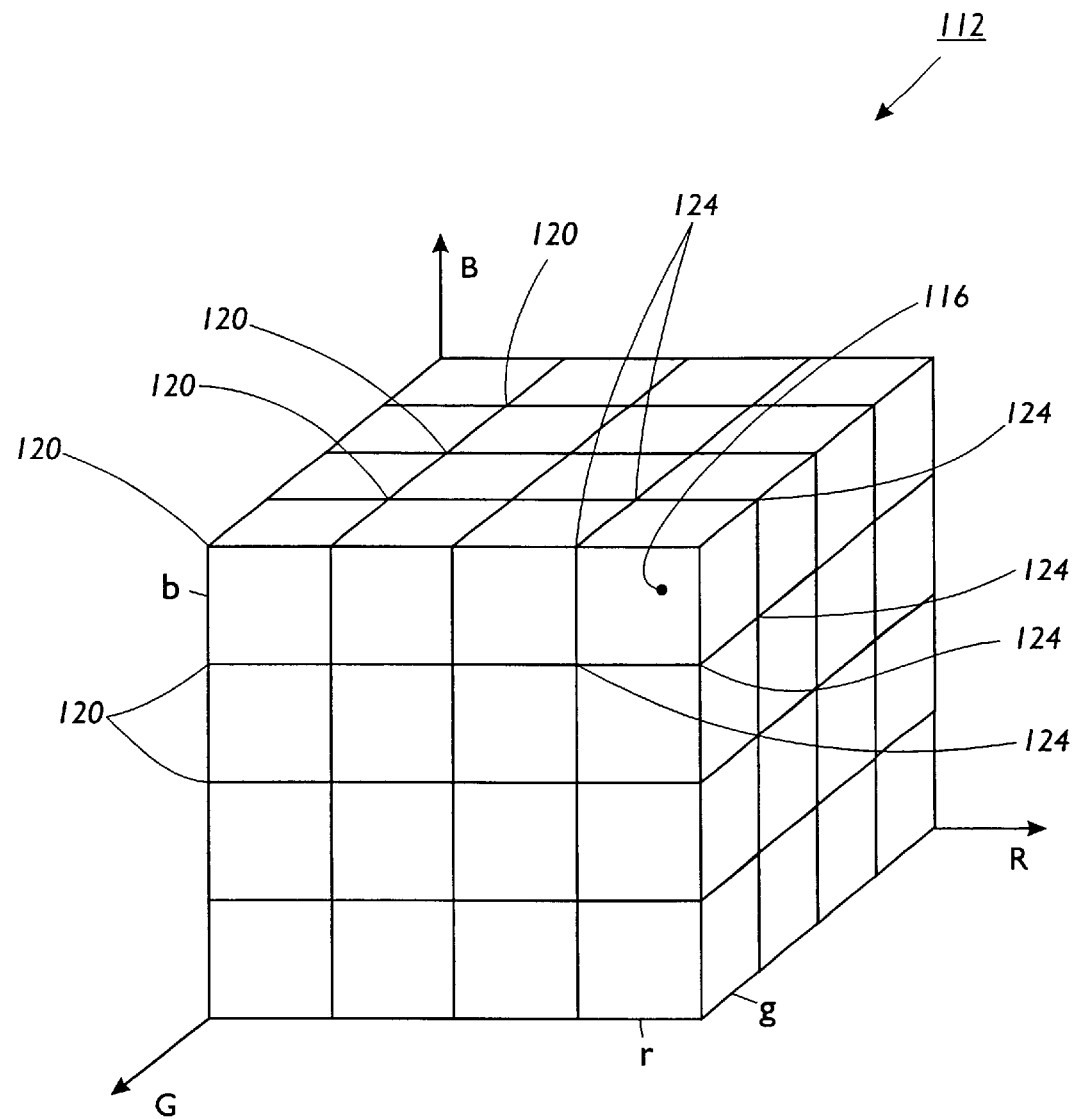
FIG. 1 is a depiction of a portion of a prior art look up table having separable tiling.

In a color space division step 418, information discovered in the relationship examination step 414 is used to intelligently partition the first color space with less regard for separability or tile uniformity than is required when lookup tables such as those described in reference to FIG. 1 and FIG. 2 are used. For example, regions of the first color space that correspond to points where the relationship between the color spaces is relatively linear are divided into large tiles. If smaller tiles were used in these regions then transformation information associated with each of the smaller tiles would be approximately the same. Therefore, little information is lost by using large tiles and storing fewer copies of the transformation information. In regions where the relationship between color spaces changes non-linearly, the first color space is divided into a large number of small tiles. This achieves a fine quantization in this region and improves transformation accuracy. Transformation information stored in association with each of these small tiles is significantly different. Regions of the first color space that correspond to unimportant regions of the second color space are also associated with large tiles.

Figure 5:
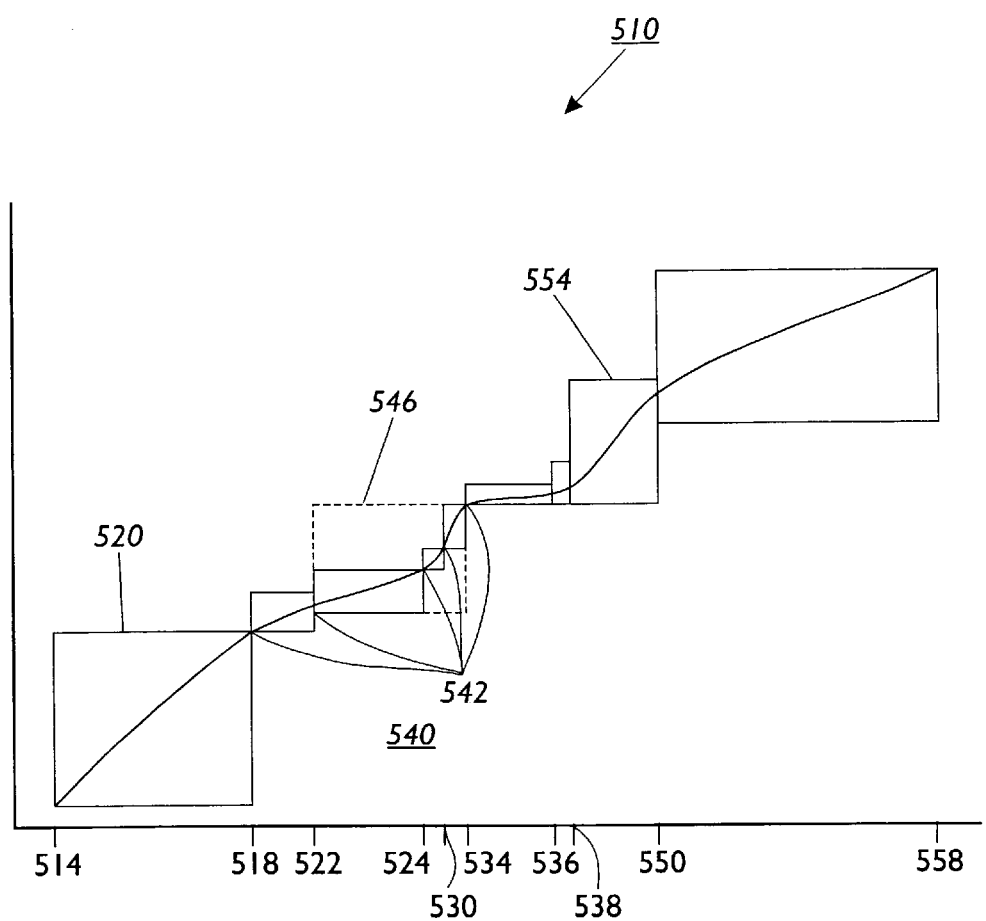
FIG. 5 is a graph showing an exemplary relationship between two colors spaces and tiling schemes associated therewith.

For example, referring to FIG. 5, the concepts discussed in reference to step 418 are illustrated with a simple two-dimensional description 510 of a relationship between a first color space parameter and a second color space parameter. For example, the first color space parameter is a red pixel value and the second color space parameter is a magenta pixel value. Between a first red value 514 and a second red value 518 the relationship between red and magenta is relatively constant. Therefore, even though the range between the first red value 514 and the second red value 518 is relatively large, one large tile 520 is all that is required to accurately represent the relationship and provide for accurate interpolated transformation values. However, near the second red value 518 the relationship between red and magenta changes. Additionally, the relationship changes several times in rapid succession near a third 522, fourth 524, fifth 530, sixth 534, seventh 536 and eighth 538 red values. The region of the first color space that includes the third 522, fourth 524, fifth 530, sixth 534, seventh 536 and eighth 538 red values correspond, for example, to an important portion of the second color space. Therefore, small tiles 540 are used in this region to divide the first color space into regions that are accurately represented by, for example, nodes 542 of the tiles. If larger tiles, such as a dotted tile 546 were used, then inaccuracies would result. For example if the nodes 542 of the larger tile were used for interpolation for the transformation of a red value corresponding to a locations away from the nodes of the larger tiles, then differences in the relationship as seen from the nodes and from the location away from the nodes would result in significant errors. A region between the eighth 538 and a ninth red value 550 is moderately variable and is, for example, only moderately important to accurate image representation. Therefore an intermediately sized tile 554 is used in this region. The relatively large size of the tile in this moderately variable region may introduce some small errors. However, since the colors in this region are only somewhat important, small errors are deemed acceptable. A region between the ninth red value 550 and a tenth red value 558 has a fairly constant relationship between red and magenta. Therefore, a large tile is used to represent this region of the first color to second color space relationship.

Preferably, the color space is divided into tiles using a recursive segmentation technique. For example, referring to FIG. 6, an exemplary two-dimensional color space 610 is divided into a plurality of tiles. Some of the tiles A, B, C, D, E, F, G, H, I, J are labeled for the purpose of discussion. For example, tile A encompasses a region of the first color space where the relationship between the first color space and the second color space is relatively constant. Similarly, tiles B, C, D and E encompass other relatively linear regions of color space. Therefore, first color space tiles A, B, C, D, E are selected to be relatively large. In a region of the first color space encompassed by tiles F, G, H, I the relationship between the first and second color spaces changes more quickly. Therefore, tiles F, G, H, and I are relatively smaller than tiles A, B, C, D, and E. Similarly, the relationship between the first and second color spaces changes relatively quickly in the region of the first color space encompassed by tiles K, L, and M. Therefore tiles K, L and M are the same size as tiles F, G, H, and I. A region of the first color space encompassed by tile J is relatively unimportant. For example, the region encompassed by J is related to a region of the second color space that is outside the color gamut of an output device. Therefore, the relatively large tile J, can be, and is, used to encompass this region of the first color space. Tiles N, O, P, and Q encompass a region of the first color space where the relationship between the first and second color space changes non-linearly. Therefore, this region of the first color space is segmented or tiled into relatively very small tiles N, O, P, and Q. The illustrated segmentation or tiling of the first color space 610 is recursive. For example, first the first color space 610 is divided into four quadrants. The quadrants are too large to be used as tiles. Therefore, a second recursion or iteration is carried out within each quadrant. Each quadrant is divided or segmented into four sub-quadrants. For example, tiles A, B, C, D result from a division or segmentation of a first quadrant. Tiles E and J are part of the result of segmenting a second quadrant in the second recursion. In certain regions of the color space 610, still finer granularity is desired. In those regions a third recursion or iteration is carried out. For example, tiles F, G, H, I, K, L, and M are the result of such a third recursion or iteration. For example, a segment of similar size to tiles A, B, C, D, E and J is divided or segmented into four sub-sub-quadrants F, G, H, I. Where finer tiling granularity is required a fourth recursion is carried out. For example, a sub-sub-quadrant of a size similar to that of tiles F, G, H, I, K, L, and M is further divided into sub-sub-sub-quadrants N, O, P, and Q as the result of such a fourth recursion. If finer quantization or granularity is required additional iterations or recursions are carried out. The above described segmentation scheme, wherein each axis of a color space is divided in half and then half again and yet half again, is a recursive binary segmentation scheme. Other segmentation schemes are possible. However recursive binary segmentation is preferable, as will be seen below, because recursive binary segmentation is compatible with recursive binary addressing. Recursive binary addressing is in turn compatible with the preferable selected search tree architecture. When the color space is two-dimensional, this segmentation scheme is called a quad-tree. When the color space is three-dimensional this segmentation scheme is called an oct-tree.

While recursive segmentation has been illustrated in terms of the two-dimensional color space 610, it is to be understood that recursive segmentation and the techniques described below, are applied equally well in color spaces of more dimensions. For example, the technique is preferably applied to color spaces of three (such as, for example, RGB and L*a*b* color spaces), four dimensions (such as, for example CMYK color space) and more (such as, for example Hi-Fi color space) dimensions. Those of ordinary skill in the art will immediately understand how to extrapolate the technique into color spaces of more than two dimensions.

Referring again to FIG. 4A, the tiles of the first color space are associated with a search tree address in a search tree address association step 422. Search trees and search tree addresses are further explained below. Preferably, the search tree addresses are associated with tiles in a recursive binary addressing scheme. For example, referring to FIG. 7, a second exemplary color space 710, segmented in a manner similar to that of the first exemplary color space, includes axes or color space parameters X1, X2. The origin 714 of the axes (where both parameters have the value 0) is depicted as the upper left corner of the color space. The second exemplary color space is first divided into four large quadrants. The quadrants are numbered in binary, in a manner illustrated by a numbering pattern 810 depicted in FIG. 8. For example, a first quadrant 716 is numbered 00, a second quadrant 718 is numbered 01, a third quadrant 720 is number 10 and a fourth quadrant 722 is numbered 11. The numbers are related to the most significant bits in a binary representation of values along the axes. For example, binary representations of values along the X1 axis at points adjacent to the first quadrant 716 (and also the second quadrant 718) have the value zero in the most significant bit position. This is because values along the X1 axis at points adjacent to the first quadrant 716 and second quadrant 718 represent values that are less than half a full-scale value of X1. A first position 812 in the numbering pattern 810 is related to the X1 axis. Therefore, the first position in the numbering pattern 810 is zero in the first 816 and second 818 quadrants of the numbering pattern 810. The second bit position 819 in the numbering pattern 810 is related to the X2 axis. As on the X1 axis, values on the X2 axis adjacent to the first quadrant 716 of the second exemplary color space 710 represent less than one half the X2 full-scale value. Therefore they have a zero in the most significant bit position and the second bit position in the first quadrant number has the value zero. However, values on the X2 axis that are adjacent to the second quadrant 718 represent more that one half the X2 full scale value and have a value of one in the most significant bit position. Therefore, the second bit position of the number associated with the second quadrant 718 is a one. Similar explanations apply to sub-quadrants of the four quadrants 716, 718, 720, 722. The numbering pattern 810 is applied to sub-quadrants of the second exemplary color space 710. For example, four sub-quadrants 726, 728, 730, 732 of the second quadrant 718 are numbered recursively with the number pattern 810. At the sub-quadrant level, the bit positions in the numbering pattern 810 are related to a second from most significant bit in binary representations of the values on the axis adjacent to the sub-quadrants. For example, values on the X1 and X2 axes adjacent to the first sub-quadrant 726 of the second quadrant 718 contain the value zero in the second to most significant bit position. Therefore, the first sub-quadrant 726 is numbered 00. Adjacent to the second sub-quadrant 728 of the second quadrant 718, the second most significant bit of values of X1 contain the value zero and the second most significant bit of values of X2 contain the value one. Therefore, the recursive address association scheme has appropriately associated the second sub-quadrant 728 of the second quadrant 718 with the address segment 01. The recursion can continue until the desired quantization is achieved in every region of the color space, or until the number of bits used to represent values of X1 and X2 are consumed. For example, a third sub-quadrant 730 of the second quadrant is further divided into four sub-sub-quadrants 732, 734, 736, 738. The fourth sub-sub-quadrant 738 is further divided into four sub-sub-sub-quadrants 740, 742, 744, 746. The recursive binary addressing scheme is applied to each to level of subdivision as described above. At the end of the recursive binary addressing scheme, a search tree address associated with each tile is assembled through the concatenation of the address segments applied to the quadrants and sub-quadrants associated with each tile.

For example, a search tree address associated with the first sub-quadrant 726 of the second quadrant 718 is assembled by concatenating the address segment associated with the first sub-quadrant 726 of the second quadrant 718 (00) to the address segment of the second quadrant 718 (01) to form the tile search tree address 0100. Similarly, an address associated with the fourth sub-sub-sub-quadrant 746 is assembled from the address segments associated with the quadrant 718 and all the sub-quadrants 730, 738 that encompass the fourth sub-sub-sub-quadrant 746 as well as the address segment of the fourth sub-sub-sub-quadrant 746 itself. Therefore, a search tree address associated with the fourth sub-sub-sub-quadrant 746 is 01101111.

Figure 6:
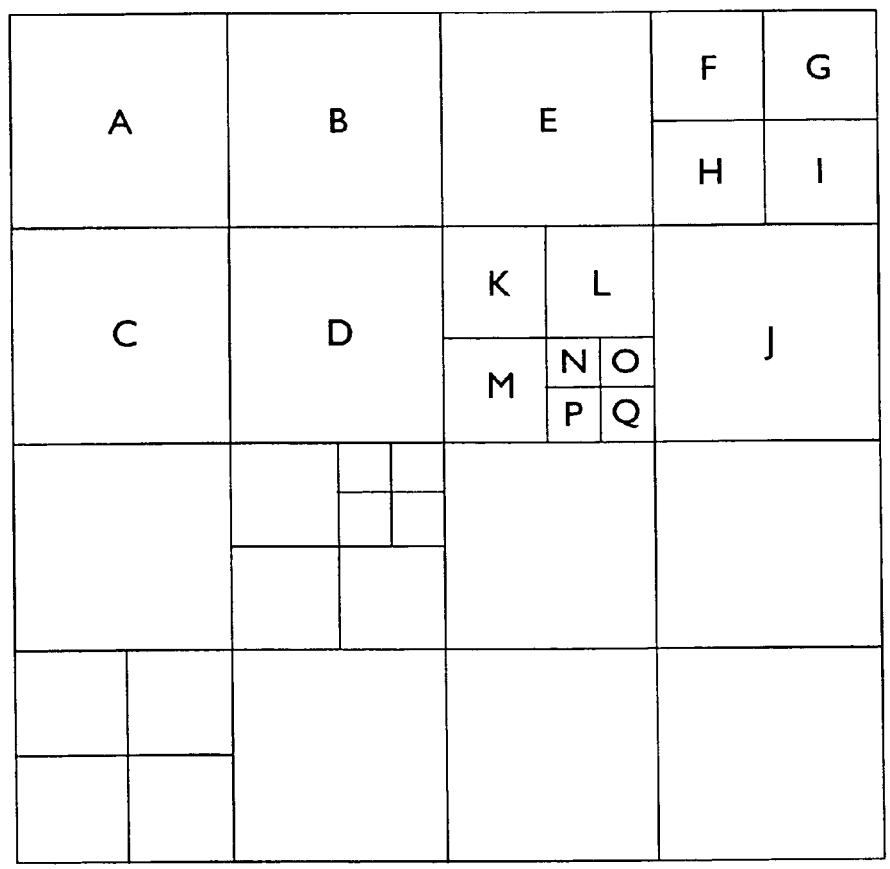
FIG. 6 is a depiction of a color space lookup table that is tiled in a recursive manner that is not restricted to separable tiling.
Figure 7:
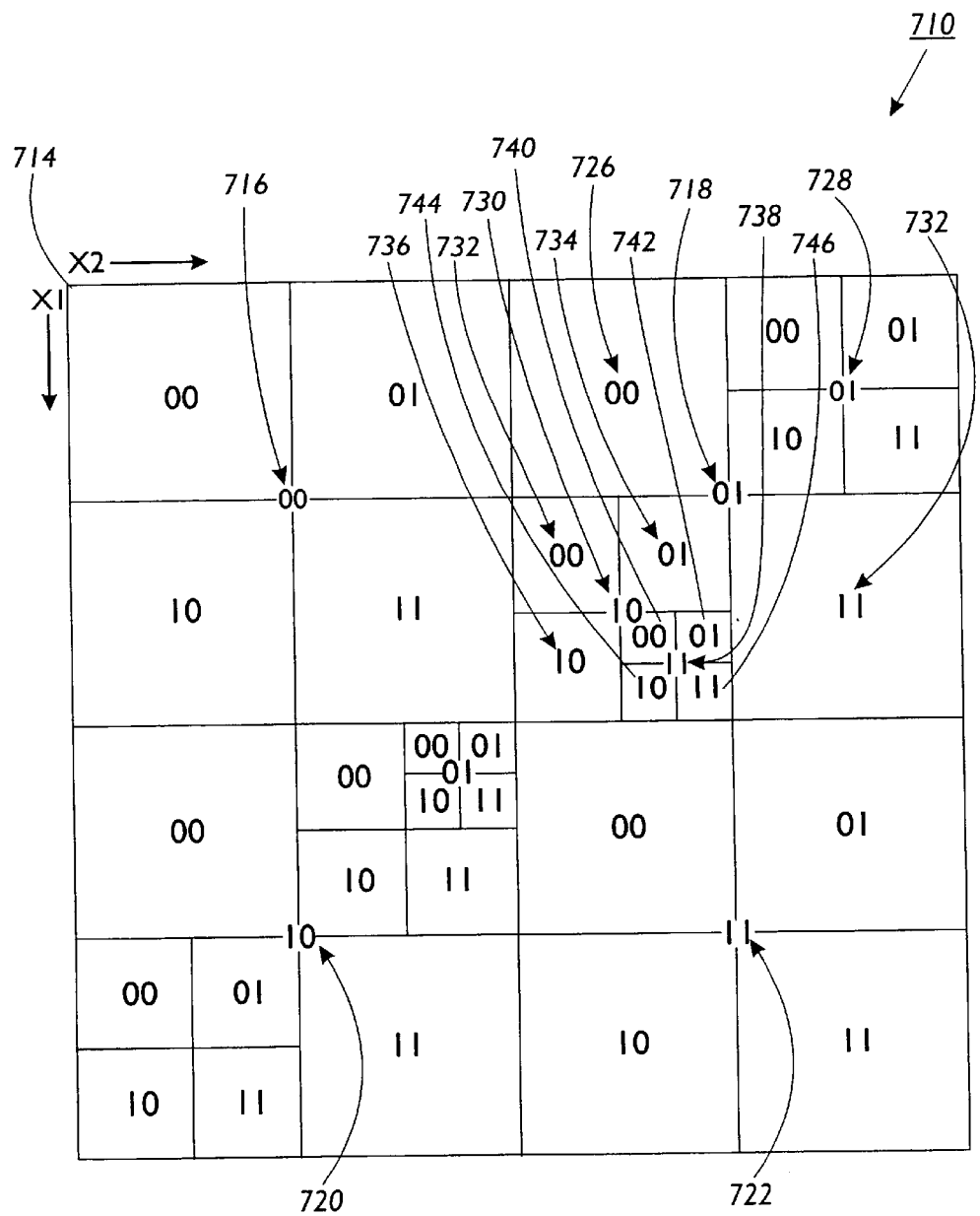
FIG. 7 is a depiction of the color table of FIG. 6, wherein a recursive search-tree addressing scheme is used to associate a search tree address or transversal cold with each of the tiles.
Figure 8:
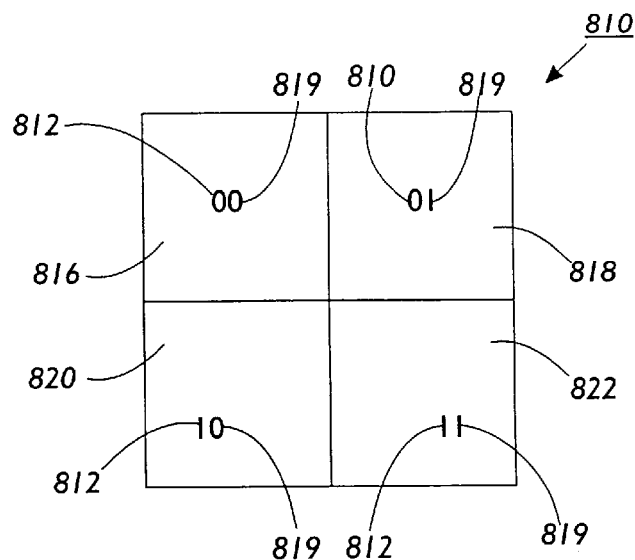
FIG. 8 illustrates a recursive binary addressing pattern that is applied in FIG. 7.
Figure 9:
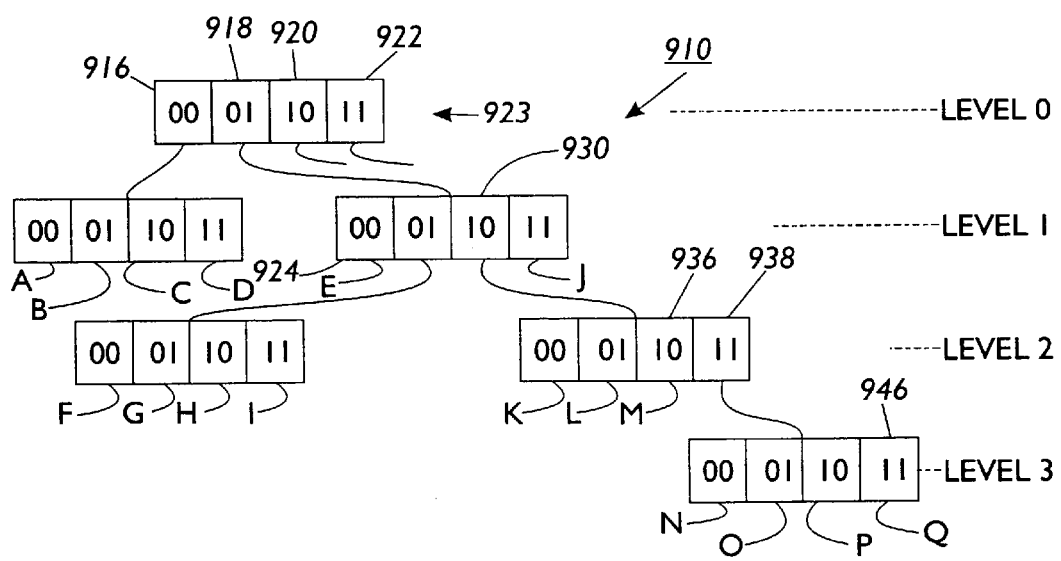
FIG. 9 is a search tree diagram illustrating a relationship between the tiling and addressing of FIG. 6 and FIG. 7 and a search tree architecture including search tree levels and traversal codes.

Referring to FIG. 9, and with continued reference to FIG. 6 and FIG. 7, the meaning of search tree address and search tree level are now further explained. FIG. 9 illustrates a search tree segment 910. The segment is related to an upper half portion of the two-dimensional color space of FIG. 6 and FIG. 7. FIG. 7 illustrates the relationship between the color space and the addresses of nodes and sub nodes of the search tree. The letters A-Q of FIG. 6 are now used to represent transformation information or data related to the tiles of the color space 610 and stored in terminal nodes or leaves of the search tree. The quadrants 716, 718, 720, 722 of FIG. 7 are related to nodes 916, 918, 920, 922 at a root 923 or level 0 of the search tree. The data represented, for example, by E in FIG. 6 is stored in a terminal node or leaf at a level 1 of the search tree. A search tree path that leads to data E is from node 918 (search tree address segment or traversal code 01) to node or leaf 924 (search tree address segment 00). Therefore, a search tree address, or traversal code, of the data E is 0100. Similarly, a path that leads to data M at search tree level 2 is from node 918 (search tree address segment 01) to node 930 (search tree address segment 10) and then to node 936 (search tree address segment 10). Therefore, a search tree address or traversal code leading to the data M is 011010. In a final example, a path that leads to data Q at search tree level 3 is from node 918 (search tree address segment or traversal code 01) to node 930 (search tree address segment 11), then to node 938 (search tree address segment 10) and finally to node 946. Therefore, a search tree address or traversal code leading to the data Q is 01111011.

It is important (in order to better understand discussions to follow) to keep in mind that the search tree address of a particular node (in the search tree) or tile (in a segmented or divided color space 610) is related to the values of first color space parameters that are encompassed by the tiles. Recalling the discussion related to FIG. 7 and FIG. 8, the first bit of the exemplary search tree addresses is related to the first bit of an X1 parameter, the second bit of the exemplary search tree address is related to the first bit of an X2 parameter. The third bit is related to the second bit of an X1 parameter, the fourth bit is related to the second bit of an X2 parameter. The fifth bit of the exemplary search tree addresses is related to the third bit of an X1 parameter, the sixth bit of the search tree address is related to the third bit of an X2 parameter, and so on and so forth. Therefore, given a particular set of first color space parameter values, a search tree address can be generated by interleaving bits describing those first color space parameter values.

It is also important to understand that the search tree address of a tile, generated as describe above, includes the most significant bits of all the first color space parameter sets encompassed by the tile. In other words, all the various combinations of first color space parameter values encompassed by a tile in the color space 610 share the same bit values in their most significant bit positions and those bit values make up the search tree address associated with the tile.

Referring once again to FIG. 4A, having completed the search tree address association step 422, search tree level statistics are compiled in a search tree frequency calculation step 424. For example, the total number of search tree leaves or terminating nodes (containing transformation data) is determined. Additionally, the number of leaves at each level of the search tree is determined. As will be seen, the number of leaves at each level will be used to determine the most efficient way to search for appropriate transformation information.

As has been mentioned and/or implied above, leaves of the search tree contain information that is useful in transforming a color description based in a first color space into a color description based in a second color space. Preferably, the information in a particular leaf encapsulates a description of a relationship between the color spaces in a region of the first color space encompassed by a tile related to the leaf.

In order to conserve transformation table memory, the method 410 allows for the use of non-separable color space tiling. The use of non-separable tiling means that the traditional use of color space parameter values as direct indices into a color table does not work. The method 410 substitutes database storage and retrieval techniques in place of the use or the traditional parameter value indices.

Therefore, in a database storage step 425, information associated with the individual leaves of the search tree 910 is assigned a database key and is stored in association with the database keys in a database. As will be apparent to those of ordinary skill in the art, without the use of a mechanism such as a database, where non-separable tiling is used, finding appropriate transformation information for a particular set first color space parameter values, requires either a prohibitive amount of memory or a prohibitive amount of processing time. Where an appropriate database or search tree architecture is selected and used, the number of storage locations consumed need only be as high as the number of tiles or search tree leaves.

For example, in one embodiment, the database storage step comprises a hashing key generation step 426, a hashing function selection step 428, and hashing table creation step 430. Hashing tables are known in the database art. For example, hashing tables are described in, "THE ART OF COMPUTER PROGRAMMING, VOLUME 3, SORTING AND SEARCHING" by Donald E, Knuth, Addison-Wesley Publishing Company, Copyright 1973. In summary, the goal of the hashing key generation step 426 and the hashing function selection step 428 is to generate a set of hashing table cell indices, for the leaves of the search tree, that are a continuous series of consecutive integers, and that uniquely identify each hashing key. Those of ordinary skill in the art will understand that, in most, if not all computer and microprocessor architectures, it is beneficial, when building and addressing a table, to have continuous table indices, so that, for example, a next table call can be addressed by simply incrementing a current table cell address. A review of the discussion referencing FIG. 6, FIG. 7 and FIG. 9 will make it clear that, in general, the search tree addresses do not have this characteristic of continuousness. Instead, there are large numerical gaps between the values of the search tree addresses. Therefore a table built to use the search tree addresses as indices, would necessarily include large sections or gaps of unused memory. Ideally, the use of a hashing function and a hashing table eliminates those gaps. Ideally, a hashing function generates a unique value in association with each search tree leaf and generates a set of values, in association with all search tree leaves, which is a set of consecutive integers. In practice, the set of values associated with the search tree leaves is typically a set of integers with moderate numbers of small gaps. For example, instead of 1, 2, 3, 4, . . . 16, a set might consist of 1, 2, 4, 5, 6, 8, 9, 11, 13, 14, 16, 17, 18, 20, 21, 22).

In one embodiment, the hashing key generation step 428 comprises appending bits indicative of the level of a search tree leaf to the search tree address or traversal code of the leaf. For example, referring to FIG. 9, the search tree address or traversal code of the leaf 924 containing transformation information E is 0100, and the leaf 924 is on level one of the search tree 910. Therefore, this embodiment generates a hashing key having the value 0100,1 or, with the level encoded in a three-bit bit field 0100001. Similarly, the search tree address or traversal code of the leaf 946 containing transformation information Q is 01111011, and the leaf 946 is on level three of the search tree 910. Therefore, this embodiment generates a hashing key having the value 01111011,3 or, with the level encoded in a three-bit bit field 01111011011. Preferably, a selected search tree architecture yields a search tree that has no more than eight levels (even in color spaces of three or more dimensions). Therefore, a three-bit bit field is sufficient to represent search tree levels.

Once each search tree leaf or color space tile is associated with an appropriate hashing key, a hashing function is selected, in the hashing function selection step 428, which is appropriate for the particular set of hashing keys. For example, one implementation of the hashing function selection step comprises searching for an appropriate set of parameters p1 and p2 for the equation H=(key*p1) mod p2, wherein p1 is a prime number and p2 is the size of the table. It is preferable that p2 be a power of two. When p2 is a power of two the modulus operation can be implemented as a computationally fast and simple masking operation. For some sets of keys, it may be necessary to restrict p2 to be a prime number (rather than a power of two).

One way to perform the p1, p2 selection process is to begin by selecting p2 to be the smallest power of 2 greater than the number of keys in the set. The next step in the selection process is to determine a maximum value of p1. It is preferable that the value of p1 be limited to prevent an overflow condition when p1 is multiplied by a key in the set of key with a largest numerical value. Therefore, it may be preferable to limit p1 based on an architecture of an image processor used to perform the method 410. The next step is to test permissible values of p1. For each value tested, an attempt is made to build a table, for example, by inserting each key in a hashing table cell pointed at by a cell index generated by the hashing function. If an attempt is made to insert a key in a cell that already contains a key, testing is stopped and a new value of p1 is selected for testing. If all the keys from the set of keys are inserted, an appropriate hashing function has been found.

If no value of p1 is found on this first attempt, the value of p2 is doubled, and the above described process is repeated. This process can, of course, be repeated until the size of the table, as controlled by the value of p2, is larger than can be tolerated. Of course, whenever the value of p2 is larger than the number of keys in the set, there will be gaps of discontinuities in the hashing table and the table will therefore be larger than is ideal.

If the above described process does not provide a suitable hashing function, the next step is to switch from testing powers of two for p2, to testing prime numbers. The first prime selected for testing is the first prime number greater than the number of keys. Again, permissible values of p1 are tested. If necessary, additional prime numbers are tested for p2 until the size of the table is too large.

If this process fails, a next step is to try another form of hashing function. For example, a higher order polynomial can be used. One such higher order polynomial is H=(p1*key+p2)*key mod p3.

Preferably, a so-called "perfect hashing function", that provides a unique cell index for each key, is found. Alternatively, a non-perfect hashing function may be used. A non-perfect hashing function sometimes yields the same cell index for two or more different hashing keys. When this happens, some collision avoidance or exception handling procedure must be employed. For example, in a cell where a collision of two or more keys would otherwise occur, a pointer is stored. For example, the pointer indicates the location of a small table containing all the keys and related transformation information what would otherwise have collided at the cell address or index. Many other perfect and non-perfect hashing schemes are known in the database art. Many, if not all of them, are applicable here.

Once a hashing function is found, or perhaps coincident with the process of finding the hashing function, transformation information or data is stored in a hashing table, in a transformation information storage step 430. The transformation information is stored in association with a related hashing key. As will be seen later, the hashing key is used to verify that the appropriate transformation data has been found. The transformation information may take the form of node values from the tiles of the first color space. As is the case with traditional lookup tables, node values are second color space parameter values related to particular first color space parameter values. When a particular set of first color space parameter values does not exactly correspond to a node, existing nodes that are in close proximity to the particular set of first color space values are used to transform the particular set of first color space parameter values to an appropriate set of second color space parameter values. For example, the nodes in close proximity are interpolated to calculate an appropriate set of second color space parameter values.

Alternatively any other kind of transformation information may be stored in the hashing table cells. For example, the coefficients of a transformation equation, or transformation instructions may be stored.

Once the Database is complete, for example, once the hashing table is full, a first color space pixel or set of first color space parameter values can be transformed into a second color space pixel or set of second color space parameter values.

Figure 4B:
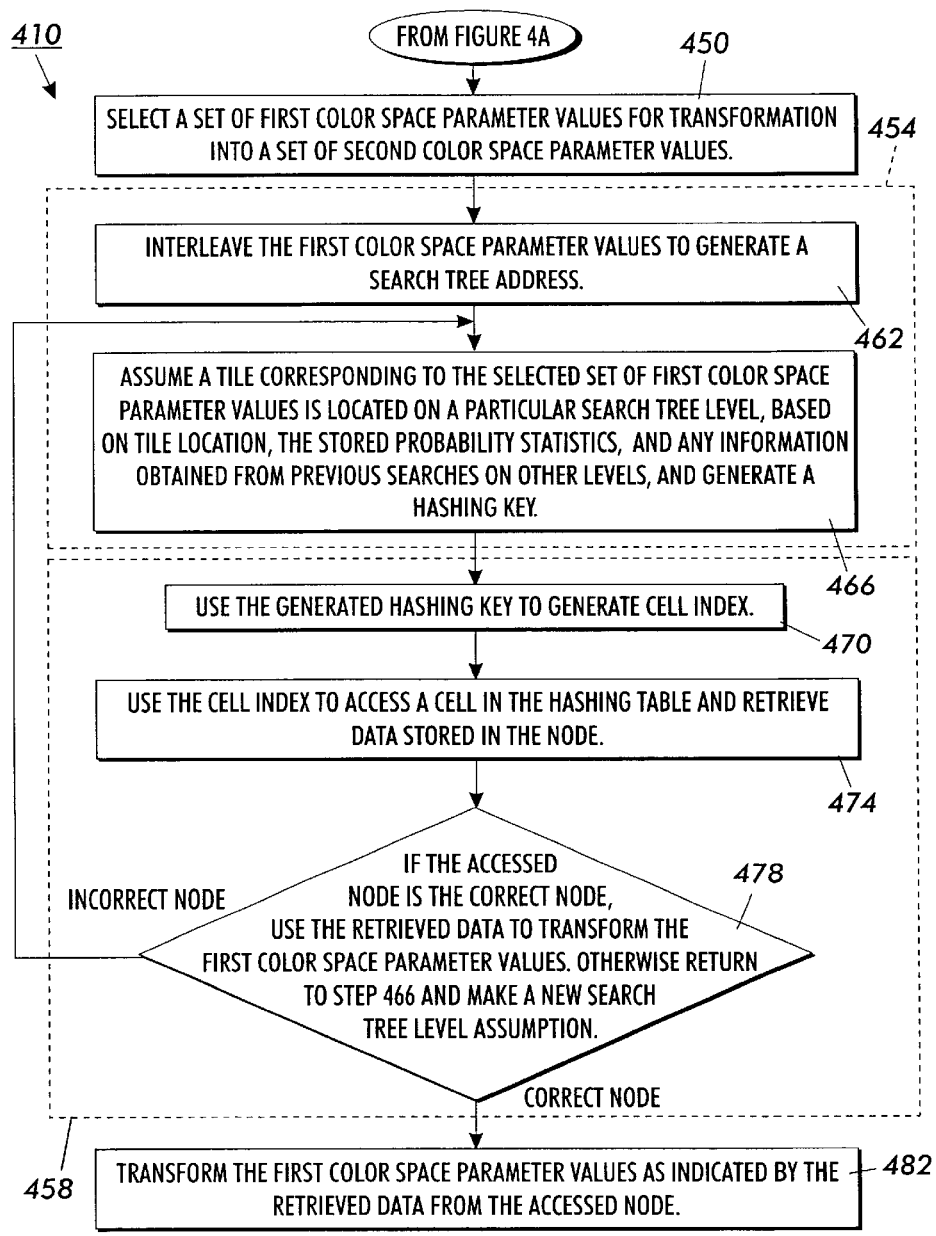

Referring to FIG. 4B, in a first color space parameter value set selection step 450 a first color space pixel or set of first color space parameter values is selected or received for transformation. For example, a pixel is selected or received from an input image. The input image is from, for example, a scanner or is presented in the form of an electronic file or data stream.

In a database key generation step 454 values from the selected pixel or set of first color space parameter values are used to generate a database key. The generated database key is then used in a database-accessing step 458, to locate appropriate transformation information for the selected pixel or set of first color space parameter values.

For example, in one embodiment, the database key generation step 454 comprises a first color space parameter value interleaving step 462, and a database, or hashing key generation 466, and the database-accessing step 458 comprises a cell index generation step 470, a node-accessing step 474 and a cell-testing step 478.

In the first color space parameter value-interleaving step 462, bits representing first color space parameter values are interleaved to generate a hashing index. For example, assuming that the first color space is the two dimensional color space of FIG. 6 and FIG. 7, and that the parameters of the first color space, X1 and X2, are represented by eight-bit values then a pixel selected or received for transformation comprises, for example, the values X1=01100101, X2=10001011. Interleaving those values generates a hashing index HI=0110100001100111. Interleaving bits is accomplished, for example, by using the values X1 and X2 individually to access a look up table wherein the bits of the values are spread out in a larger word. For example, entries in the table include padding zeros. For instance an X1 padding table transforms the value 01100101 to 0010100000100010. An X2 padding table transforms the value 10001011 to 0100000001000101. Interleaving is accomplished then by ORing the two padded values to generate the interleaved hashing index 0110100001100111. Those of ordinary skill in the art will understand how to extrapolate this procedure for color spaces of three or more dimensions.

In the database or hashing key generation step 466 bits are selected from the hashing index and used to generate a hashing key. For example, the stored search tree level statistics are consulted to determine the most likely level to begin searching for the appropriate transformation information. In the example of FIG. 9, six leaves are located on level one, seven leaves are located on level two and four leaves are located on level three. Therefore, the most likely level to find the appropriate transformation information is level two.

Based, for example, on that information, a search tree level selection is made. For instance, an assumption is made that the appropriate transformation information will be found on level two. A review of the discussion in reference to FIG. 9 will indicate that the traversal code or search tree address of a leaf on the second level of the search tree 910 has six significant bits. Therefore the six most significant bits of the hashing index are selected. Alternatively, or additionally, information about the history of tree levels associated with previously processed pixels can be used to select the tree level of the current pixel. For example, once a first pixel from, for example, an image, is processed and a correct search tree level is found for that pixel, that correct level can be assumed or selected as the first tested level of the next pixel. This method may have speed advantages where pixels are processed in an order related to the color described by the pixels, or where it is likely that neighboring pixels are of similar color. Alternatively, one might want to look at other statistics. For example, pick the most frequently found correct level for previously processed pixels neighboring a current pixel. Which ever level selection technique is used, a related number of significant bits is selected from the hashing index. Additionally, a review of the discussion in reference to the hashing key generation step 426 will indicate that bits representative of the level of a leaf are appended to the search tree address or traversal code of the leaf, in order to generate a hashing key associated with the leaf. The goal of the database or hashing key generation step 466 is to determine the value of the hashing key of a leaf that is related to a tile that encompasses the first color space color description encoded in the selected pixel or set of first color space parameter values. Therefore, bits representative of the assumed or selected search tree level are appended to the selected hashing index bits to generate a hashing key. For example, the hashing key generated for the selected X1, X2 values is Hashing Key=011010010.

In the cell index generation step 470, the generated hashing key is processed through the same hashing function as was selected in the hashing function selection step 428. The result of the use of the hashing function is a cell index.

In the cell-accessing step 474, an attempt is made to access data pointed at by the generated cell index. However, since the bits appended to the selected bits are only indicative of an assumed or selected level, it is possible that the generated cell index points at an empty or non-existent cell. In any event, an attempt is made to access cell data. For example, a hashing key stored in association with transformation information is accessed.

In the cell-testing step 478, information from the cell is examined to determine if the cell is the right cell. For example, the hashing key stored in the cell in association with the transformation information, in the hashing table creation step 430, is compared to the generated hashing key. If the stored hashing key and the generated hashing key are the same value, then the cell is the correct cell. If they are not the same value or if the access key contains a null value, then the assumed or selected level of the leaf is incorrect and a new assumption or selection must be made. For example, if imperfect hashing is used, then additional locations that might contain the generated hashing key are also tested, until either the generated key is found of a null value is found. When a null value is found, the database or hashing key generation step 466 and subsequent steps are repeated until a key matching the generated key is found. For example, the next most likely level is assumed to be the correct level.

For instance, a visual comparison of traversal code portion of the Hashing Key=011010010 and FIG. 9 will show that search tree path to the appropriate transformation data for the selected pixel index runs from node 918 (traversal code 01) to node 930 (traversal code 0110) to node 936 (traversal code 011010). Therefore, the assumption that the leaf is on level two is correct and the correct cell is found in an initial search and the hashing key matches the hashing key used for leaf or node 936. Therefore, the hashing function generates the cell index of the cell containing the matching hashing key and transformation information M.

In instances where the initial level assumption or selection is incorrect a second search is performed. In the second search the next most likely level is assumed or selected. In the example of FIG. 9, the next most likely level is level one. If a cell with a matching traversal code or search tree address on level one contained a matching hashing code the search would be successful and end at that point. If not, a third search is attempted and so on. Once the correct transformation information is found it is used in a transformation step 482 to transform the selected pixel or set of first color space parameter values to a set of second color space parameter values. For example, the transformation information is a set of node values from a color space tile associated with the hashing table cell. In that case, interpolation techniques, such as, for example tetrahedral interpolation techniques are used to generate the second color space parameter values.

Alternatively, other kinds of transformation information are retrieved. For example, encoded equations or algorithms are retrieved for use in transforming the set of first color space parameter values.

Figure 10:
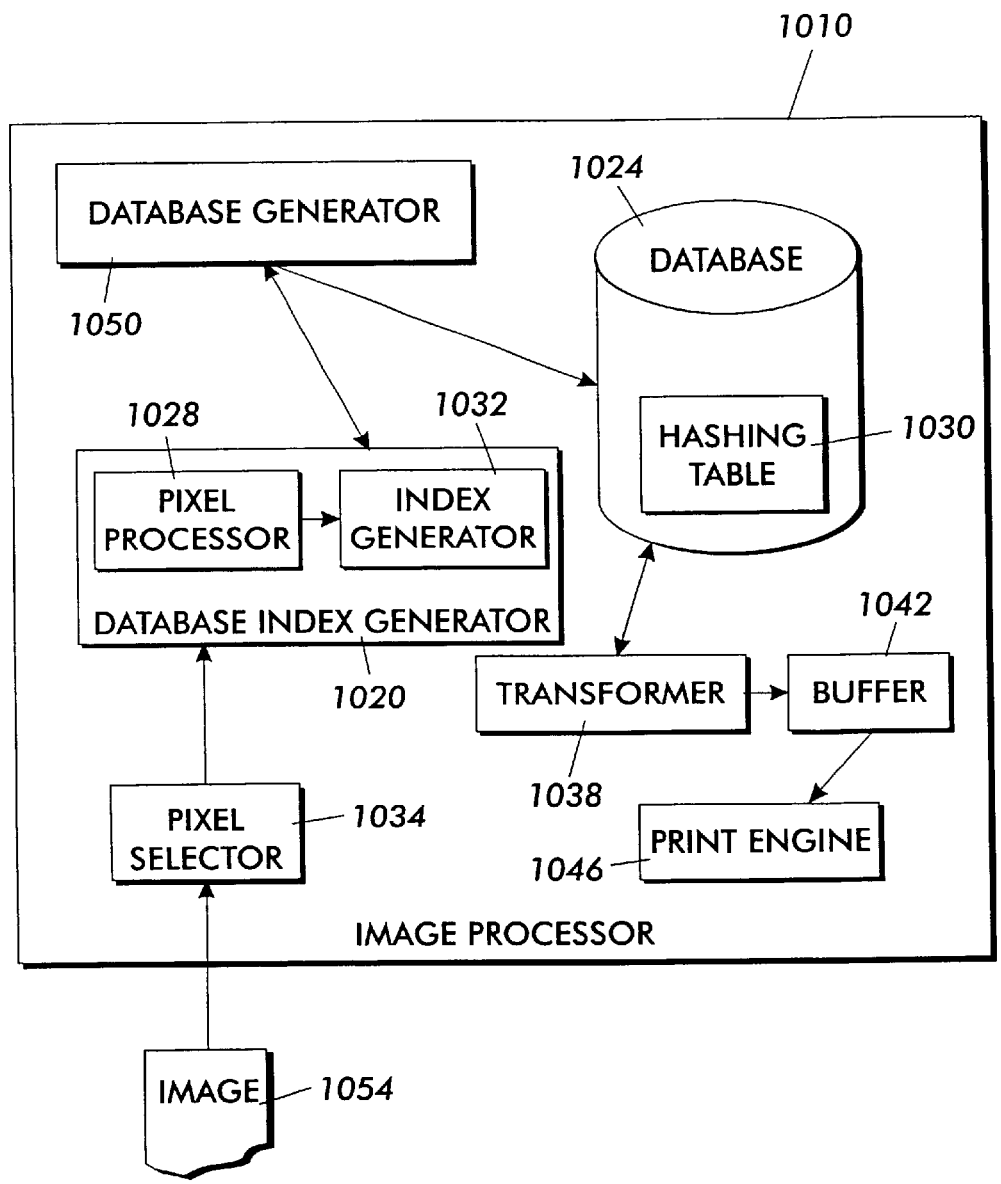
FIG. 10 is a block diagram of an image processor operative to perform the method of FIG. 4A–FIG. 4B.

Referring to FIG. 10, an image processor 1010 operative to carry out the high-speed method 410 for using non-separable tiling in color transformations comprises a database index generator 1020 and a search tree based transformation information database 1024. The database index generator 1020 comprises a pixel processor 1028 and an index generator 1032. For example, the search tree based database 1024 comprises a hashing table 1030. In some embodiments the image processor 1010 further comprises a pixel selector, a transformer 1038, an image buffer 1042 and an output device 1046. Some embodiments further comprise a database generator 1050.

In operation, the pixel processor 1028 manipulates first color space parameter values, received from the pixel selector 1034, to generate a key. For example, the pixel processor 1028 is a color space parameter value interleaver/search tree level appender. The pixel selector 1034 selects (step 450) a pixel from, for example, a first color space image 1054 and delivers the pixel to the pixel processor within the database index generator 1020. The pixel processor 1028 interleaves bits representing first color space parameter values from the selected pixel (step 462) to generate, for example, a hashing index. The pixel processor consults search tree leaf probability statistics, selects bits from the hashing index and appends bits representing a most likely search tree level to the selected bits to generate a hashing key (step 466). The index generator 1032 receives the hashing key from the pixel processor and uses it to generate a cell index (step 470). The cell index is passed to a transformer 1038. The transformer 1038 uses the cell index to access the hashing table 1030 within the database 1024 in search of a cell or database record containing appropriate transformation information (steps 474, 478). For example, the transformation information is useful in the transformation of the set of first color space parameter values selected by the pixel selector 1034. When the transformer 1038 finds the correct database record or cell, the transformer 1038 uses transformation information in the record or cell to transform the set of first color space parameter values into a set of second color space parameter values (step 482).

In most embodiments the set of second color space parameter values is delivered to the image buffer 1042. For example, the image buffer 1042 accumulates second color space color descriptions until a complete second color space description of the first color space image 1036 is assembled. Complete second color space image descriptions are typically delivered to the output device 1046. For example, the second color space image description is delivered to a mass storage device such as, for example, a disk drive or networked file server. Alternatively, the output device 1046 is a display device or a print engine. For example, the output device 1046 is a CRT, xerographic printer, or other computer printer, such as for example, an ink jet printer.

If included, the database generator 1050 is used during system maintenance. The database generator 1050 collects calibration information (step 414) from sensors (not shown) and, optionally, from an image processor operator. The database generator 1050 translates the calibration information into useful transformation information, and stores the transformation information in the database 1024. Alternatively, database generation is performed by external devices, for example at an image processor factory. In that case the database 1024 is installed as part of a manufacturing or calibration procedure. Whether the database generator is included in image processor or is generally detached from the image processor, when it is in use, the database generator communicates with the database index generator 1020. For example, the database generator uses and/or updates the database index generator 1020. For instance, calibration changes may require the first color space to be segmented or tiled in a different manner (step 418). If that is the case, it may be necessary to use a new hashing function (steps 422, 424, 426). The database generator, database index generator 1020, and the transformer 1038 work together to select an appropriate hashing function (step 428). Whether or not the hashing function is updated, an appropriate hashing function is used by the database generator in order to store new transformation information (step 430).

The invention has been described with reference to particular embodiments. Modifications and alterations will occur to others upon reading and understanding this specification. For example, the invention has been described in reference to a two dimensional color space. However, the invention is preferably implemented in relation to multidimensional color spaces. For example, color space tiles have been described as squares, however tiles comprising cubes and hyper-cubes are used in color spaces of three or more dimensions. Where transformation rules or interpolation techniques are discussed, precalculation and look up tables may be substituted. In some embodiments, wherein, for example, the database does not comprise a hashing table, the database index generator comprises other sub-components, and may pass a database key to the transformer instead of passing a cell index. Where image processors and personal computers are referred to, other devices, such as, for example, devices comprised of distributed network components may be substituted. It is intended that all such modifications and alterations are included insofar as they come within the scope of the appended claims or equivalents thereof.

What is claimed is:

1. A method operative for transforming a description of a color from a first color space, defined by first color space parameters, into a second color space, defined by second color space parameters, the method comprising the steps of:

storing transformation data in a search tree based database;

receiving a set of first color space parameter values for transformation;

generating a database index from the set of first color space parameter values;

using the generated database index to access transformation data in the database; and transforming the first set of color space parameter values to a set of second color space parameter values based on the accessed transformation data.

2. The method of claim 1 wherein the step of storing transformation data in a search tree based database comprises:

determining a relationship between the first color space and the second color space;

dividing the first color space into a plurality of tiles, each tile being of a respective size and shape, each respective size and shape being a function of 1) the relationship between the first color space and the second color space and 2) a selected search tree architecture;

assigning a respective search tree key to each tile;

storing transformation information related to respective tiles in association with respective search tree keys of the respective tiles.

3. The method of claim 1 wherein the step of storing comprises storing transformation data in an oct-tree based database.

4. The method of claim 1 wherein the step of generating a database index comprises the steps of:

generating a hashing key from the first color space parameter values; and using the hashing key in a hashing function to generate the database index.

5. The method of claim 1 wherein the step of generating a database index comprises the steps of:

interleaving bits representing the first color space parameter values to generate a hashing index;

selecting a search tree leaf associated with the set of first color space parameter values is located at a particular level of the search tree;

selecting bits from the hashing index based on the selected level;

combining selected level indicating bits with the selected bits to generate a hashing key;

using the hashing key in a hashing function to generate the database index.

6. The method of claim 1 wherein the step of transforming the first set of color space parameter values to a set of second color space parameter values comprises:

interpolating between nodes of a tile related to the database index.

7. The method of claim 2 wherein the step of assigning a respective search tree key to each tile comprises assigning a respective hashing key to each tile.

8. The method of claim 2 wherein the step of assigning a respective search tree key to each tile comprises:

assigning a respective search tree address to each tile; and combining the search tree address of each tile with a representation of a respective search tree level of each tile to generate the respective search tree key for each tile.

9. The method of claim 4 further comprising:

accessing a hashing table cell associated with the database index;

testing cell data to determine if the cell is associated with an appropriate hashing key; and if the cell is not associated with the appropriate hashing key, determining a new database index based on the first color space parameter values and the results of the testing step.

10. A method operative for transforming a description of a color from a first color space, defined by first color space parameters, into a second color space, defined by second color space parameters, the method comprising the steps of:

storing transformation data in a hashing table;

receiving a set of first color space parameter values for transformation;

generating a hashing key from the set of first color space parameter values;

using the hashing key in a hashing function to generate a cell index;

using the cell index to access transformation data in the hashing table; and transforming the first set of color space parameter values to a set of second color space parameter values based on the accessed transformation data.

11. The method of claim 10 wherein the step of storing comprises:

dividing the first color space into a plurality of tiles of selected sizes;

associating each tile with a search tree address;

using the search tree address associated with each tile to generate a hashing key for each tile;

using a hashing function to generate a cell index related to each tile from the hashing key generated for that tile; and storing transformation information particular to each tile in association with the hashing key of that tile and the generated cell index.

12. The method of claim 10 wherein the step of generating a hashing key from the set of first color space parameter values comprises:

generating a search tree address from the first color space parameter values;

selecting a search tree level; and combining a selected portion of the search tree address with a representation of the selected search tree level to assemble a hashing key.

13. The method of claim 10 further comprising, prior to the step of using a hashing function, selecting the hashing function.

14. The method of claim 12 further comprising:

accessing a stored hashing key in a hashing table cell pointed to by the generated cell index;

comparing the assembled hashing key with the stored hashing key; and if the stored hashing key does not match the assembled hashing key, selecting a different search tree level and repeating the step of combining.

15. The method of claim 11 wherein the step of dividing the first color space into a plurality of tiles further comprises dividing the first color space into relatively small tiles where the relationship between the first color space and the second color space is non-linear.

16. The method of claim 11 wherein the step of dividing the first color space into a plurality of tiles further comprises dividing the first color space into relatively large tiles, where the relationship between the first color space and the second color space is linear.

17. The method of claim 11 wherein the step of dividing the first color space into a plurality of tiles further comprises dividing the first color space into relatively small tiles, where a high degree of transformation accuracy is desired.

18. The method of claim 11 wherein the step of dividing the first color space into a plurality of tiles further comprises dividing the first color space into relatively large tiles, where a lower degree of transformation accuracy can be tolerated.

19. The method of claim 11 wherein the step of dividing the first color space into a plurality of tiles further comprises:

selectively applying a recursive segmentation scheme wherein the number of recursions used in any particular region of the first color space is based on a desired granularity in that region.

20. The method of claim 11 wherein the step of using the search tree address further comprises:

selecting significant bits from the search tree address;

appending bits representative of the search tree level to the selected significant bits to generate a hashing key for each tile.

21. The method of claim 12 wherein the step of generating a hashing index comprises interleaving bits from the first color space parameter values.

22. The method of claim 12 wherein the step of selecting a search tree level comprises using search tree level statistics.

23. The method of claim 12 wherein the step of selecting a search tree level comprises using history information from previously processed first color space parameter values.

24. The method of claim 13 wherein the step of selecting an appropriate hashing function further comprises:

searching for appropriate values for p1 and p2 in a function H=(key*p1) mod p2, wherein p1 is a prime number and p2 is a power of two and a size of a hashing table.

25. The method of claim 13 wherein the step of selecting an appropriate hashing function further comprises:

searching for appropriate values for p1 and p2 in a function H=(key*p1) mod p2, wherein p1 and p2 are prime numbers and p2 is a size of a hashing table.

26. The method of claim 19 wherein the step of selectively applying a recursive segmentation scheme further comprises selectively applying a recursive binary segmentation scheme.

27. The method of claim 25 wherein the step of associating each tile with a search tree address further comprises selectively applying a recursive binary addressing scheme.

28. An image processor operative to transform a first image description, based in a first color space, described by a set of first color space parameters, into a second image description, based in a second color space, described by a set of second color space parameters, the image processor comprising:

a database index generator operative to generate database indices base on respective sets of first color space parameter values;

a search tree based database operative to store transformation information for a plurality of regions of color space in association with the database indices.

29. The image processor of claim 28 wherein the database index generator further comprises:

a pixel processor operative to manipulate first color space parameter values to generate a key; and an index generator operative to use the key to generate a cell index.

30. The image processor of claim 28 wherein the database comprises a hashing table.

31. The image processor of claim 28 further comprising a transformer operative to use the cell index to access transformation data in the database and use the transformation data to transform the first color space parameter values into a set of second color space parameter values.

32. The image processor of claim 31 further comprising:

an image buffer operative to store a plurality of second color space parameter values, thereby forming a second color space image; and an output device operative to receive the second color space image.

33. The image processor of claim 32 wherein the output device comprises a print engine.

34. The image processor of claim 33 wherein the print engine comprises a xerographic printer.

35. The image processor of claim 29 wherein the pixel processor further comprises an interleaver/appender operative to interleave bits of the first color space parameter values and append bits representative of a particular search tree leaf level to the selected bits to generate a hashing key.

36. The image processor of claim 29 wherein the cell index generator further comprises a hasher operative to perform a hashing function on the key to generate the cell index.

* * * * *